US010102154B2

(12) United States Patent
Piwonka

(10) Patent No.: US 10,102,154 B2
(45) Date of Patent: *Oct. 16, 2018

(54) PROTECTED MEMORY AREA

(71) Applicant: HEWLETT-PACKARD DEVELOPMENT COMPANY, L.P., Houston, TX (US)

(72) Inventor: Mark A. Piwonka, Tomball, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 358 days.

This patent is subject to a terminal disclaimer.

(21) Appl. No.: 15/147,761

(22) Filed: May 5, 2016

(65) Prior Publication Data
US 2016/0253270 A1   Sep. 1, 2016

Related U.S. Application Data

(63) Continuation of application No. 14/391,209, filed as application No. PCT/US2012/049045 on Jul. 31, 2012, now Pat. No. 9,367,691.

(51) Int. Cl.
*G06F 12/00* (2006.01)
*G06F 12/14* (2006.01)
(Continued)

(52) U.S. Cl.
CPC ........ *G06F 12/1425* (2013.01); *G06F 9/4401* (2013.01); *G06F 12/0238* (2013.01);
(Continued)

(58) Field of Classification Search
None
See application file for complete search history.

(56) References Cited

U.S. PATENT DOCUMENTS 7,844,809 B2   11/2010   Brannock et al.
7,921,286 B2    4/2011   Wooten
(Continued)

FOREIGN PATENT DOCUMENTS

CN   102103673   6/2011

OTHER PUBLICATIONS

European Search Report (extended) ~ Application No. 12882436.6-1954/2880527 dated Mar. 3, 2016 ~ 7 pages.
(Continued)

*Primary Examiner* — Daniel D Tsui
(74) *Attorney, Agent, or Firm* — HP Inc. Patent Department

(57) ABSTRACT

In some examples, in response to a computing device powering on, a protected memory area inaccessible to an operating system is created, where the protected memory area includes information relating to instructions and an indication settable to a first value to indicate that the instructions are allowed to access a memory external of the protected memory area, and a second value to indicate that the instructions are not allowed to access the memory external of the protected memory area. In response to creating the protected memory area, the indication is modified from the first value to the second value to restrict the instructions when executed from accessing the memory external of the protected memory area. In response to modifying the indication, code in the computing device is launched, the launched code comprising the operating system or firmware.

20 Claims, 5 Drawing Sheets

(51) Int. Cl.
*G06F 12/02* (2006.01)
*G06F 21/57* (2013.01)
*G06F 9/4401* (2018.01)

(52) U.S. Cl.
CPC .......... *G06F 12/0246* (2013.01); *G06F 12/14* (2013.01); *G06F 21/572* (2013.01); *G06F 21/575* (2013.01); *G06F 2212/1052* (2013.01); *G06F 2212/7201* (2013.01); *G06F 2212/7207* (2013.01)

(56) References Cited

U.S. PATENT DOCUMENTS

| | | |
|---|---|---|
| 7,984,286 B2 | 7/2011 | Zimmer et al. |
| 2003/0229794 A1 | 12/2003 | Sutton et al. |
| 2005/0060526 A1 | 3/2005 | Rothman et al. |
| 2005/0114639 A1 | 5/2005 | Zimmer et al. |
| 2006/0004982 A1 | 1/2006 | Matheny |
| 2009/0119748 A1 | 5/2009 | Yao et al. |
| 2009/0172385 A1 | 7/2009 | Datta et al. |
| 2010/0058046 A1 | 3/2010 | John et al. |
| 2011/0145598 A1 | 6/2011 | Smith et al. |
| 2011/0271090 A1 | 11/2011 | Zimmer et al. |

OTHER PUBLICATIONS

International Search Report and Written Opinion, International Application No. PCT/US2012/049045, dated Mar. 25, 2013, pp. 1-7.

Shawn Embleton et al., "SMM Rootkits: A New Breed of OS Independent Malware," SecureComm 2008, Sep. 22-25, 2008, Istanbul, Turkey, pp. 1-12, ACM.

PROTECTED MEMORY AREA

CROSS REFERENCE TO RELATED APPLICATIONS

This is a continuation of U.S. application Ser. No. 14/391,209, filed Oct. 8, 2014, which is a national stage application under 35 U.S.C. § 371 of PCT/US2012/049045, filed Jul. 31, 2012, which are both hereby incorporated by reference in their entirety.

BACKGROUND

When managing security for a computing device, an operating system of the computing device can be used to manage access between applications and content of the computing device. The operating system can control access to secure content on the computing device, such as financial information and/or identification information for a user. If the operating system is compromised due to malicious software, the malicious software can circumvent the security of the computing device to gain access to secured content.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

A computing device creates a system management (SMM) page table in response to powering on from a power off state. The power off state can be a mechanical off state or a soft off state of the computing device. For the purposes of this application, the SMM page table is a data structure included within system management memory of the computing device. The system management memory is a protected area of memory, such as random access memory, included within the computing device. The SMM page table includes pages which store mappings between locations of the system management memory and virtual addresses used by applications or processes of the computing device.

In one embodiment, the pages in the SMM page table include content, such as lines of executable code. In another embodiment, the pages of the SMM page table include addresses of the system management memory where the lines of executable code reside. Each page included in the SMM page table includes a corresponding executable bit. An executable bit includes a flag or register which identifies whether the contents of the corresponding page can access content residing outside the system management memory. The computing device can modify the executable bits to restrict the lines of code from the SMM page table and/or the system management memory from accessing content residing outside the system management memory.

The computing device modifies the executable bit of the pages included in the SMM page table before an option read only memory (ROM) of the computing device is launched. For the purposes of this application, the option ROM includes an operating system of the computing device or a firmware of a component that is launched by a basic input/output system (BIOS) of the computing device. The option ROM resides outside of the system management memory. The computing device can modify the executable bits by disabling the executable or by setting the executable bits to not execute.

As a result, by modifying the executable bits of the page table before the option ROM is launched, the computing device restricts lines of code of the SMM page table and/or the system management memory from making calls to the option ROM residing outside the system management memory. By restricting the lines of code from the SMM page table and/or the system management memory from accessing content outside the system management memory, the content of the SMM page table and system management memory are protected from malicious content residing outside the system management memory.

Figure 1:
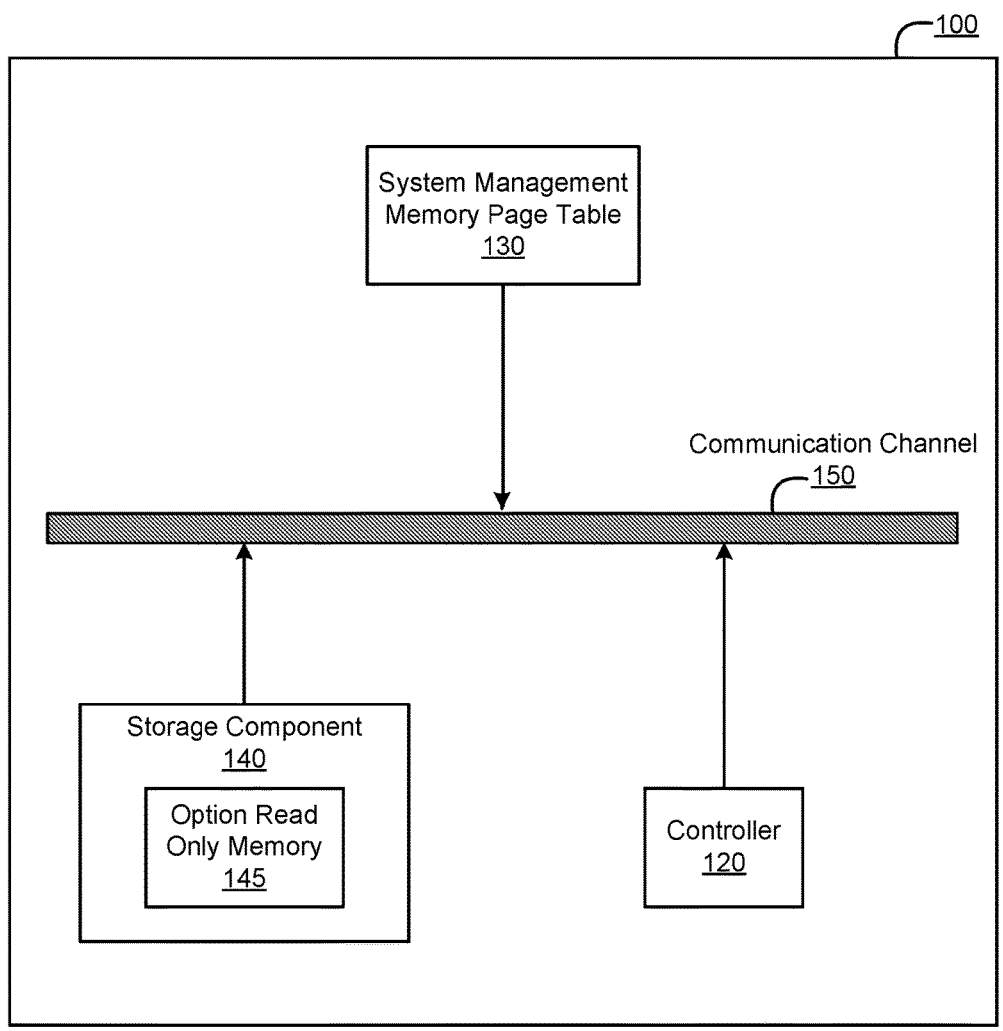
FIG. 1 illustrates a computing device with option read only memory and a system management page table according to an example.

FIG. 1 illustrates a computing device 100 with option read only memory (ROM) 145 to create a system management page table 130 according to an example. In one embodiment, the computing device 100 can be a notebook, a netbook, a tablet, a desktop, a workstation, a server, and/or an all-in-one system. In another embodiment, the computing device 100 can be a cellular device, a smart phone, a PDA (Personal Digital Assistant), an E (Electronic)-Reader, and/or any additional computing device 100 to create a system management memory page table 130.

The computing device 100 includes a controller 120, a storage component 140 including option ROM, a system management memory page table 130, and a communication channel 150 for the computing device 100 and/or one or more components of the computing device 100 to communicate with one another. In one embodiment, the computing device 100 also includes a security application stored on a non-volatile computer readable medium included in or accessible to the computing device 100. For the purposes of this application, the security application is firmware or an application which can be utilized independently and/or in conjunction with the controller 120 to manage the computing device 100. In one embodiment, the security application is a Basic Input/Output System (BIOS) of the computing device 100.

The computing device 100 can initially be in a power off state. For the purposes of this application, the power off state includes a mechanical off state or a soft off state where one or more components of the computing device 100 do not receive power. In response to transitioning from the power off state to a power on state, the controller 120 and/or the security application proceed to create a system management memory page table 130 in system management memory of the computing device 100. For the purposes of this application, the system management memory is a protected area of memory, such as a restricted or a secured partition of the memory. The memory can be a random access memory and/or any additional memory component of the computing device 100. The system management memory is inaccessible to applications, an operating system, and/or an option ROM 145 of the computing device 100.

For the purposes of this application, the system management memory (SMM) page table 130 is a data structure included within the system management memory which includes pages with executable bits. A data structure identifies how data is organized and managed as a SMM page table 130 in the system management memory. The pages of the SMM page table 130 correspond to mappings between addresses of the system management memory and virtual addresses of the computing device 100. The addresses of the system management memory correspond to locations of the system management memory. The virtual addresses include addresses for applications, processes, firmware, and/or an option ROM 145 residing outside of the system management memory.

An executable bit for a corresponding page of the SMM page table 130 identifies whether the contents of the corresponding page can access content residing outside the system management memory. In one example, the executable bit can be a flag which can be set. In another example, the executable bit can be a register which can be set or modified. The contents of a page table can include lines of code or addresses corresponding to locations of the system management memory where the lines of code reside. For the purposes of this application, the lines of code include a sequence of numbers and/or characters corresponding to instructions which can be executed.

In response to creating the system management memory page table 130, the controller 120 and/or the security application can modify the executable bits for each page of the system management memory page table 130 before an option ROM 145 of the computing device 100 is launched. In one embodiment, modifying the executable bits includes the controller 120 and/or the security application disabling the executable bits, such that the content included in the corresponding page cannot be executed and cannot execute content residing outside the system management memory. In another embodiment, the controller 120 and/or the security application can modify the executable bits by disabling them, such that the content included in the corresponding pages are inaccessible and do not access content residing outside the system management memory.

In response to modifying the executable bits, the controller 120 and/or the security application can proceed to launch an option ROM 145 of the computing device 100. For the purposes of this application, the option ROM 145 can be an operating system of the computing device 100 or a firmware of a component of the computing device 100. The firmware can be used by the controller 120 and/or the security application to manage and communicate with the corresponding component. For example, the option ROM 145 can be a video firmware for a video component of the computing device 100. The option ROM 145 can be included on a storage component 140 of the computing device 100.

Figure 2:
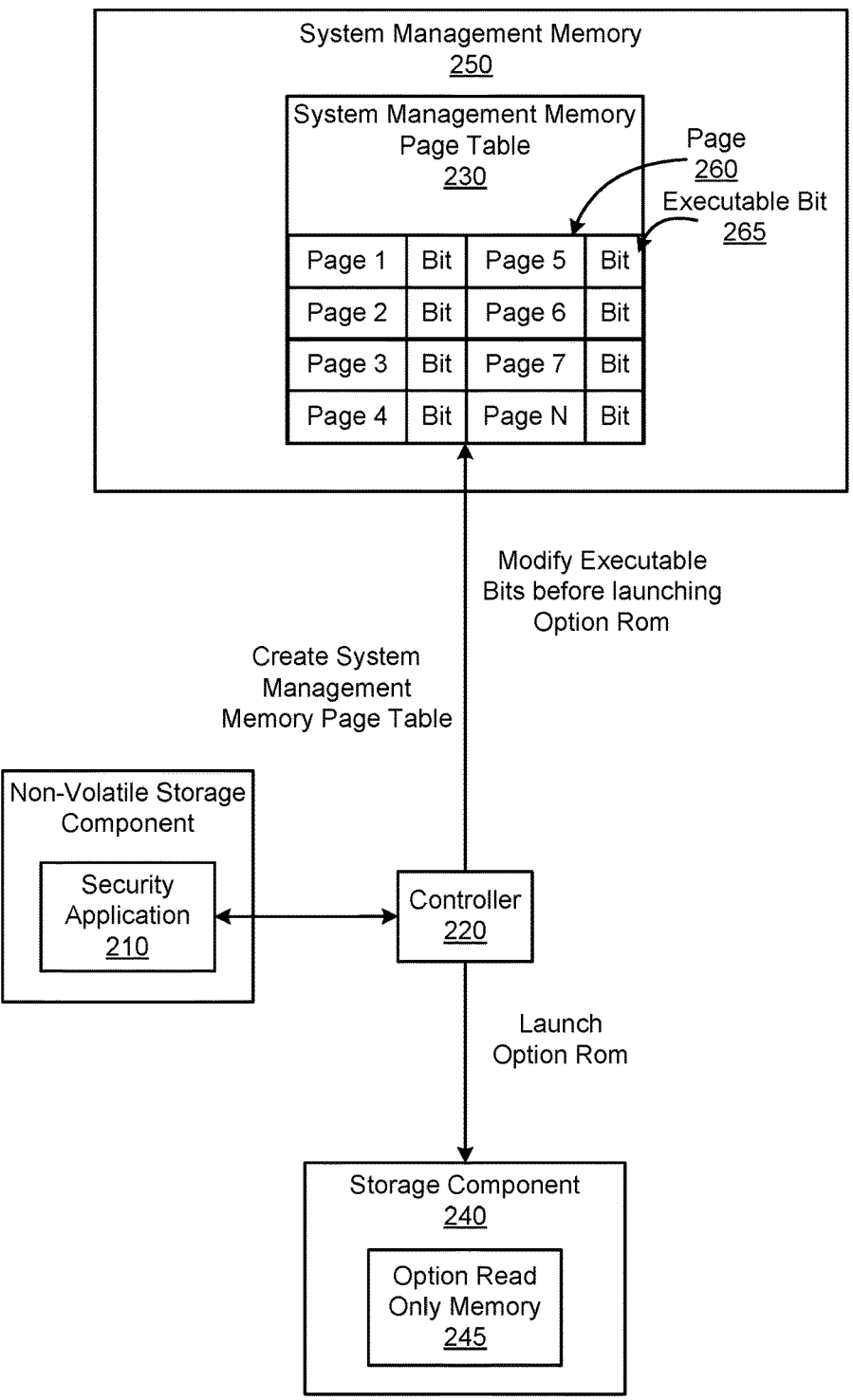
FIG. 2 illustrates a block diagram of a controller creating a system management memory page table according to an example.

FIG. 2 illustrates a block diagram of a controller 220 creating a system management memory page table 250 according to an example. As noted above, the security application 210 can be utilized independently and/or in conjunction with the controller 220 to manage the computing device. In one embodiment, the security application 210 can be a BIOS of the computing device. In another embodiment, the security application can be firmware embedded onto one or more components of the computing device. In other embodiments, the security application 210 can be an application accessible from a non-volatile computer readable memory of the computing device. The computer readable memory is a tangible apparatus that contains, stores, communicates, or transports the application for use by or in connection with the computing device. The computer readable memory can be a hard drive, a compact disc, a flash disk, a network drive or any other tangible apparatus coupled to the computing device.

The computing device can power on from a power off state. For the purposes of this application, the power off state includes a mechanical off state or a soft off state of the computing device. If the computing device is in a mechanical off state, the computing device does not receive any power. If the computing device is in a soft off state, the computing device may receive a small amount of power, such as less than 2 watts of power. When powering on from a power off state, one or more components of the computing device can receive power for the components and the computing device to become operational.

When powering on, an option read only memory (ROM) 245 of the computing device can attempt to launch. For the purposes of this application, the option ROM 245 can be an operating system or a firmware for a component of the computing device. For example, the option ROM 245 can be a firmware of a video component of the computing device. If the controller 220 and/or the security application 210 detect the option ROM 245 attempting to launch, the controller 220 and/or the security application 210 can halt the launch attempt from the option ROM 245. In one embodiment, halting the launch attempt includes the controller 220 and/or the security application 210 intercepting a launch request and suspending the launch request for the option ROM 245.

Before the option ROM 245 is launched, the controller 220 and/or the security application 210 create a SMM page table 230 in a system management memory 250 of the computing device. For the purposes of this application, the system management memory 250 includes a secured location or partition of a memory of the computing device which the controller 220 and/or the security application 210 can access. The system management memory 250 is inaccessible to applications, processes, and/or firmware residing outside of the system management memory 250. The memory can be random access memory and/or any additional memory component of the computing device.

As noted above, the SMM page table 230 is included within the system management memory 250 and includes one or more pages 260 with corresponding executable bits 265. The pages 260 of the SMM page table 230 map addresses of the system management memory 250 to virtual addresses of the computing device. In one embodiment, the pages 260 of the SMM page table 230 include lines of code which can be executed. The lines of code correspond to executable instructions stored on locations of the system management memory 250. In another embodiment, the pages 260 of the SMM page table 230 include addresses which correspond to locations of the system management memory 250 containing the lines of code.

As shown in FIG. 2, each page 260 of the SMM page table 230 includes executable bits 265. The executable bits 265 can be registers and/or flags which identify whether the content included in the corresponding page 260 or the system management memory 250 can access content residing outside the system management memory 250. The controller 220 and/or the security application 210 can modify the executable bits 265 for each page 260 included in the SMM page table 230 before an option ROM 245 of the computing device is launched. In one embodiment, the controller 220 and/or the security application 210 modify the executable bits 265 immediately in response to the SMM page table 230 being created. In another embodiment, the controller 220 and/or the security application 210 modify the executable bits 265 immediately before the option ROM 245 is launched.

Figure 3A:
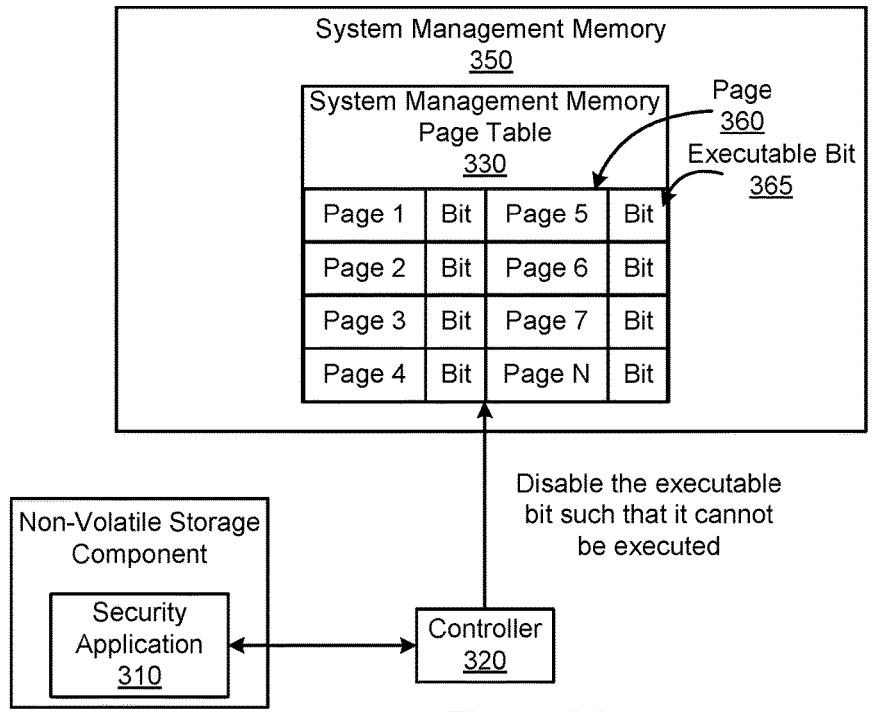
FIGS. 3A and 3B illustrate a block diagram of a controller modifying a system management memory page table according to an example.
Figure 3B:
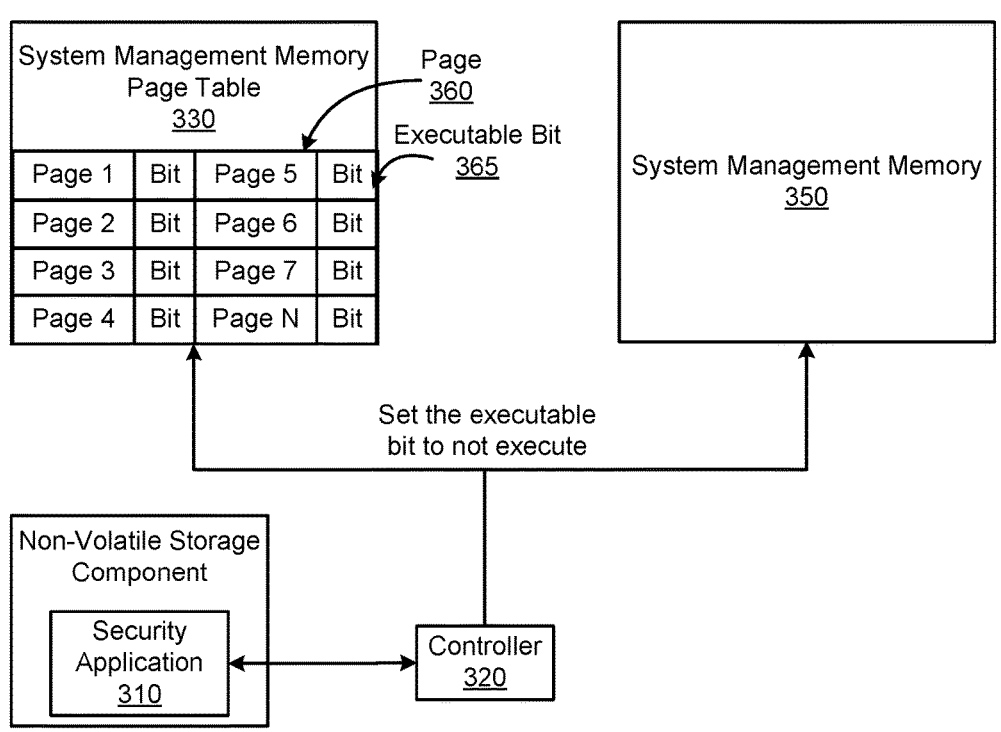

FIGS. 3A and 3B illustrate a block diagram of a controller 320 modifying a SMM page table 330 according to an example. When modifying the SMM page table 330, the controller 320 and/or the security application 310 can modify each executable bit 365 in the SMM page table 330 before an option ROM is launched. In one example, as shown in FIG. 3A, when modifying an executable bit 365, the controller 320 and/or the security application 310 disable the executable bit 365 for each page 360 in the system management memory page table 330. By disabling the executable bit 365, the controller 320 and/or the security application 310 can restrict lines of code residing on the corresponding page 360 and/or the system management memory 350 from making calls and executing any content residing outside the system management memory 350.

If the controller 320 and/or the security application 310 detect any attempts to access content outside the system management memory, the controller 320 and/or the security application 310 block the lines of code from being executed. In another embodiment, the controller 320 and/or the security application 310 can block the content residing outside the system management memory 350 from being accessed. In other embodiments, when disabling the executable bit, the lines of code residing on the SMM page table 330 and/or the system management memory 350 can appear inaccessible.

In another example, as shown in FIG. 3B, when modifying an executable bit 365, the controller 320 and/or the security application 310 can set the executable bit 365 to not execute. As a result, if any request is made to access and execute the lines of code or address of the corresponding page 360 or the system management memory 350, the controller 320 and/or the security application 310 reject the requests. Additionally, if any content from outside the system management memory 350 attempts to access the contents of the SMM page table 330 and/or the system management memory 350, the controller 320 and/or the security application 310 can reject the request.

In response to modifying the executable bits 265, the controller 320 and/or the security application 310 can allow an option ROM of the computing device to continue launching. Allowing the option ROM to launch can include unblocking the option ROM from launching. In one embodiment, launching the option ROM includes allowing a previously suspended launch request to resume.

In one embodiment, once the option ROM has been launched, the controller 320 and/or the security application 310 can detect for lines of code of the system management memory 350 attempting to execute lines of code residing outside the system management memory 350 and/or vice versa. If the controller 320 and/or the security application 310 detect lines of code from the system management memory 350 attempting to execute lines of code residing outside the system management memory 350 and/or vice versa, the controller 320 and/or the security application 310 can proceed to generate fault. The fault can reject the request, halt the lines of code from executing, and/or hang the controller 320 and/or the security application 310. The controller 320 and/or the security application 310 can also generate a report of the attempted access. The report can be outputted on a display component or stored on as a file log.

Figure 4:
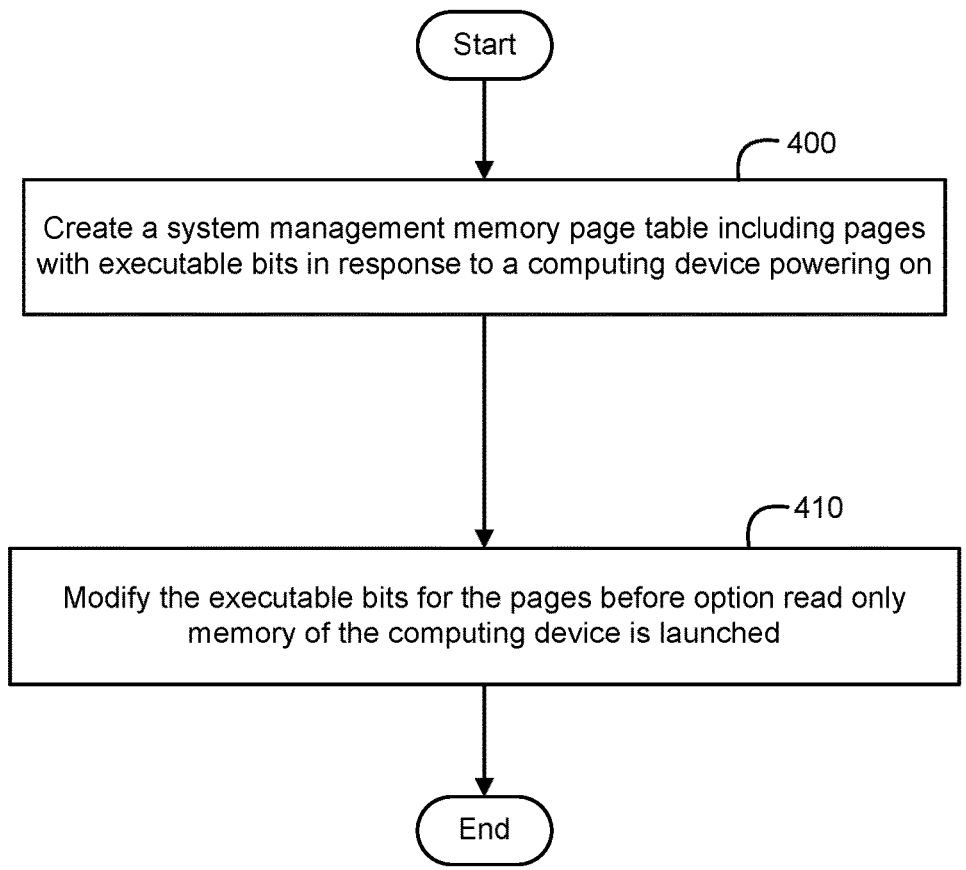
FIG. 4 is a flow chart illustrating a method for managing a computing device according to an example.

FIG. 4 is a flow chart illustrating a method for managing a computing device according to an example. The controller and/or the management application initially detect for the computing device powering on and proceed to create a system management memory page table in response to a computing device powering on at 400. As noted above, the system management memory page table is created in a system management memory of the computing device and each page of the system management page table includes executable bits. The controller and/or the management application proceed to modify the executable bits for each of the pages before option read only memory of the computing device is launched at 410. The method is then complete. In other embodiments, the method of FIG. 4 includes additional steps in addition to and/or in lieu of those depicted in FIG. 4.

Figure 5:
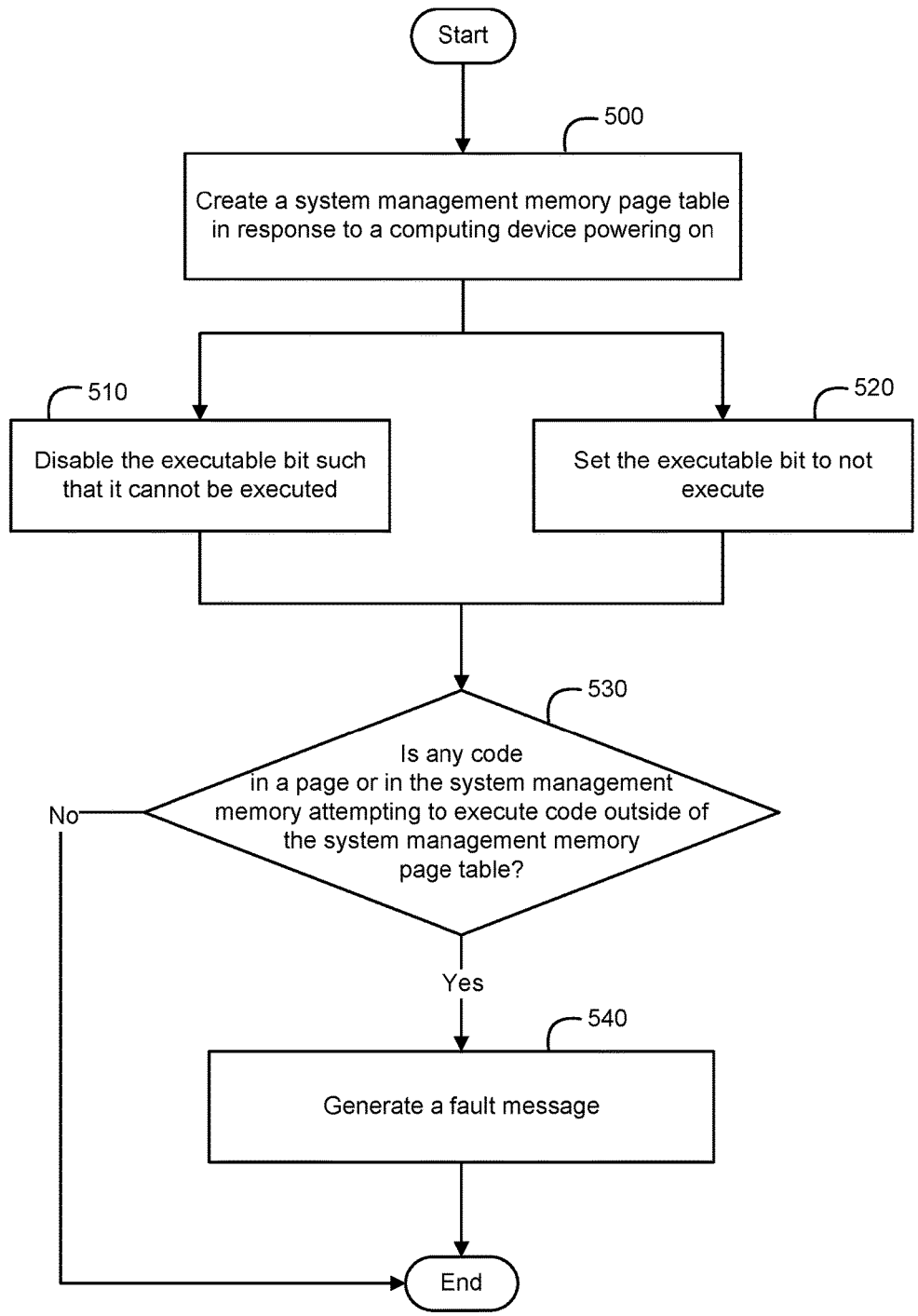
FIG. 5 is a flow chart illustrating a method for managing a computing device according to an example.

FIG. 5 is a flow chart illustrating a method for managing a computing device according to an example. The controller and/or the management application initially detect for the computing device powering on. In response to the computing device powering on, the controller and/or the management application create a system management memory page table within system management memory of the computing device at 500. The system management page table includes pages with executable bits. The controller and/or the management application proceed to modify the executable bits before an option read only memory of the computing device is launched. The option read only memory is an operating system and/or a firmware corresponding to a component of the computing device.

In one embodiment, when modifying the executable bit, the controller and/or the management application can disable the executable bit such that the executable bit and any lines of code in the corresponding page or a corresponding address of the system management memory is prohibited from execution at 510. In another embodiment, when modifying the executable bit, the controller and/or the management application set the executable bit to not execute at 520.

By modifying the executable bits, any lines of code residing in the SMM page table and/or the system management memory do not execute content residing outside of the system management memory. Additionally, any content, such as the option ROM, residing outside the system management memory cannot access and execute code or addresses residing in the pages of the system management memory page table. Once the executable bits for each page table have been modified, the controller and/or the security application can proceed to launch the option ROM.

In response to launching the option ROM, the controller and/or the management application can also detect if any lines of code from the SMM page table and/or the system management memory code attempt to access and execute content residing outside the system management memory at 530. If no lines of code attempts to execute code outside of the system management memory, the method can be complete. If the controller and/or the security application detect any code from the SMM page table and/or the system management memory attempting to access and execute content residing outside the system management memory, the controller and/or the security application proceed to generate a fault message at 540. The method is then complete. In other embodiments, the method of FIG. 5 includes additional steps in addition to and/or in lieu of those depicted in FIG. 5.

What is claimed is:

1. A method of a computing device, comprising:
in response to the computing device powering on, creating a protected memory area inaccessible to an operating system, wherein the protected memory area includes information relating to instructions and an indication settable to a first value to indicate that the instructions are allowed to access a memory external of the protected memory area, and a second value to indicate that the instructions are not allowed to access the memory external of the protected memory area;

in response to creating the protected memory area, modifying the indication from the first value to the second value to restrict the instructions when executed from accessing the memory external of the protected memory area; and in response to modifying the indication, launching code in the computing device, the launched code comprising the operating system or firmware.

2. The method of claim 1, wherein modifying the indication comprises modifying a flag or a register.

3. The method of claim 1, wherein by modifying the indication from the first value to the second value, the instructions when executed are restricted from calling the launched code.

4. The method of claim 3, wherein restricting the instructions when executed from calling the launched code protects the protected memory area from malicious code in the computing device.

5. The method of claim 1, wherein the information relating to the instructions includes:
the instructions in the protected memory area, or
an address in the protected memory area, the address referring to a memory location storing the instructions.

6. The method of claim 1, further comprising:
after launching of the code, detecting that code residing outside the protected memory area is attempting to execute the instructions; and
generating a fault in response to the detecting.

7. The method of claim 1, wherein prior to the launching of the operating system or the firmware, the indication is set to the first value to allow the instructions when executed to access the memory external of the protected memory area.

8. The method of claim 1, wherein the protected memory area is part of a system management memory.

9. The method of claim 1, where the protected memory area is created by a Basic Input/Output System (BIOS) code.

10. A computing device comprising:
a memory; and
a controller to:
in response to the computing device powering on, create, in the memory, a protected memory area inaccessible to an operating system, wherein the protected memory area includes information relating to instructions and an indication settable to a first value to indicate that the instructions are allowed to access a memory external of the protected memory area, and a second value to indicate that the instructions are not allowed to access the memory external of the protected memory area;
in response to creating the protected memory area, modify the indication from the first value to the second value to restrict the instructions when executed from accessing the memory external of the protected memory area; and
in response to modifying the indication, launch code in the computing device, the code comprising the operating system or firmware.

11. The computing device of claim 10, wherein the controller comprises a processor and a Basic Input/Output System (BIOS) code executable on the processor.

12. The computing device of claim 10, wherein the controller is to create the protected memory area in response to the computing device powering on from a mechanical off state.

13. The computing device of claim 10, wherein the protected memory area is a system management memory area.

14. The computing device of claim 10, wherein the firmware comprises video firmware for a video device in the computing device.

15. The computing device of claim 10, wherein by modifying the indication from the first value to the second value, the instructions when executed are restricted from calling the launched code.

16. The computing device of claim 15, wherein restricting the instructions when executed from calling the launched code protects the protected memory area from malicious code in the computing device.

17. The computing device of claim 10, wherein the information relating to the instructions includes:
the instructions in the protected memory area, or
an address in the protected memory area, the address referring to a memory location storing the instructions.

18. A non-volatile computer readable medium comprising instructions that upon execution cause a computing device to:
in response to the computing device powering on, create a system management memory area inaccessible to an operating system of the computing device, wherein the system management memory area includes information relating to instructions and an indication settable to a first value to indicate that the instructions are allowed to access a memory external of the system management memory area, and a second value to indicate that the instructions are not allowed to access the memory external of the system management memory area;
in response to creating the system management memory area, modify the indication from the first value to the second value to restrict the instructions when executed from accessing the memory external of the system management memory area; and
in response to modifying the indication, launch code in the computing device, the launched code comprising the operating system or firmware.

19. The non-volatile computer readable medium of claim 18, wherein the system management memory area is a secure partition in the computing device.

20. The non-volatile computer readable medium of claim 18, wherein by modifying the indication from the first value to the second value, the instructions when executed are restricted from calling the launched code.

* * * * *